(12) United States Patent
Johnson (10) Patent No.: US 9,534,732 B2
(45) Date of Patent: Jan. 3, 2017

(54) SENSOR MOUNTING BRACKET (71) Applicant: ILLINOIS TOOL WORKS INC., Glenview, IL (US)

(72) Inventor: Thomas H. Johnson, Winnebago, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 425 days.

(21) Appl. No.: 13/840,388

(22) Filed: Mar. 15, 2013

(65) Prior Publication Data

US 2014/0262555 A1    Sep. 18, 2014

(51) Int. Cl.
G01G 21/28 (2006.01)
G01G 21/22 (2006.01)
G01G 21/23 (2006.01)
G01G 21/08 (2006.01)
F16M 13/00 (2006.01)
F16M 13/02 (2006.01)

(52) U.S. Cl.
CPC ............ F16M 13/02 (2013.01); G01G 21/08 (2013.01); G01G 21/23 (2013.01)

(58) Field of Classification Search
CPC ......... G01G 21/28; G01G 21/22; G01G 21/23
USPC .... 73/774, 855–856, 860; 177/238–241, 244
See application file for complete search history.

(56) References Cited

U.S. PATENT DOCUMENTS

| 4,655,306 | A | 4/1987 | Saner |
| 5,111,896 | A * | 5/1992 | Porcari et al. ................. 177/16 |
| 5,190,117 | A * | 3/1993 | Freeman et al. ............... 177/244 |
| 5,308,934 | A | 5/1994 | Miller et al. |
| 5,756,943 | A | 5/1998 | Naito et al. |
| 6,787,713 | B2 * | 9/2004 | Kuechenmeister et al. .. 177/132 |
| 7,373,846 | B2 * | 5/2008 | Furukawa et al. ........ 73/862.621 |
| 2005/0081641 | A1 * | 4/2005 | Loher .................. G01G 3/1414 73/856 |

FOREIGN PATENT DOCUMENTS

| EP | 0227850 A1 | 7/1987 |
| EP | 0334159 B1 | 7/1993 |
| EP | 0544858 B2 | 12/1994 |
| EP | 1659378 A2 | 5/2006 |
| EP | 1046889 B1 | 8/2006 |

OTHER PUBLICATIONS

ISR for PCT/US2014/019994 mailed May 30, 2014.

* cited by examiner

*Primary Examiner* — Peter Macchiarolo
*Assistant Examiner* — Anthony W Megna Fuentes
(74) *Attorney, Agent, or Firm* — Hauptman Ham, LLP (57) ABSTRACT

The invention relates to a sensor mounting bracket comprising a base portion and at least one side wall upstanding from the edge of the at least one base portion; at least one sensor attachment fixture located on the base portion and configured to facilitate attachment of the bracket to a sensor mounting fixture, and at least one mounting element extending outwardly from the side wall configured to facilitate attachment of the bracket to a load bearing plate or a sensor support structure. The invention further relates to a symmetrical mounting bracket comprising a pair of sensor mounting brackets combined one above the other in parallel orientation.

47 Claims, 4 Drawing Sheets

SENSOR MOUNTING BRACKET

BACKGROUND

The present invention relates to a sensor mounting bracket, in particular a sensor mounting bracket for a load cell. The present invention also relates to a mounting bracket for a sensor comprising a symmetrical mounting arrangement capable of mounting effect amelioration. The invention further relates to a weigh scale system comprising a sensor mounting bracket and a sensor comprising a symmetrical mounting arrangement.

Typically sensors such as load cells are mounted to a support structure in a weigh scale system or to a reinforced part directly attached to it in an installation. The sensor is attached in at least two places when it is a load cell for sensing force. A loading fixture is mounted directly to the load cell at another location on it. Typically, the load cell is mounted to the support structure at its bottom or to one or more of its sides at one end of the load cell in a scale system. The loading fixture is mounted at the top or to one or more sides of the opposite end of the load cell. The load cell, and hence the sensor, is made stiff at these ends to reduce distortion from so-called mounting effects.

The so-called "mounting effect" can be seen as a result of mounting the sensor on the adjacent support structure and/or of mounting the loading fixture on the sensor. Fasteners, for example bolts, attaching the sensor to the attachments distort the sensor and cause output changes that are undetermined and that change with changes in load and temperature and even time and usage.

These mounting effects can be partially compensated for when the sensor is calibrated to make the sensor as accurate as possible in that configuration. However, the compensation is limited to lower accuracy sensors with poorer resolution, since these effects are undetermined and caused by unstable frictional joints that can change.

The mounting effects are only reduced by using stiffening members and through calibration of the scale system incorporating the sensor. As a result, the performance of the sensor is compromised. Particularly, for sensors wherein a lower resolution and accuracy is required, for example when between 500 to 10,000 unit divisions is required, controlling the stiffness of the sensors at attachments areas may be deemed to be adequate. However, the desire to have higher resolution and accuracy, for example when between 25,000 and 100,000 unit divisions is required, as is the case for example in part counters and pharmaceutical scales, requires an improved solution than the reduction of the mounting effects seen as a result of controlling the stiffness of the sensor at attachment areas.

Furthermore, distortion from loading and temperature in the support structure at the fixed portion of the sensor may be different than that in the loading fixture at the live portion for load cells and not enable improved symmetry in bending of the end blocks. As a result, scale systems require calibration after assembly to be accurate.

SUMMARY

It is an aim of the present invention to overcome one or more of the above drawbacks associated with the prior art.

It is a further aim of the present invention to provide an improved mounting bracket which reduces the mounting effects associated with the mounting of sensors, in particular load cell sensors.

In a first aspect, the present invention provides a sensor mounting bracket, the bracket comprising a base portion and at least one side wall upstanding from the edge of the at least one base portion; at least one sensor attachment fixture located on the base portion and configured to facilitate attachment of the bracket to a sensor mounting fixture and at least one mounting element extending outwardly from the side wall configured to facilitate attachment of the bracket to a load bearing plate or a sensor support structure.

By means of the present invention, a sensor mounted on the sensor mounting bracket according to the invention will be secured in the direction of sensor sensitivity but provide flexibility in the plane perpendicular to the direction of sensitivity. As a result, the sensor will be isolated in such a way that output is not affected as much by distortion or stress in the mounting or loading fixtures.

The function of the sensor mounting bracket is to cancel the mounting effects through symmetry and reduce the mounting effects through flexibility. The bracket is stiff in the direction of sensitivity.

This is especially advantageous where the sensor is a load cell.

It is preferred that the footprint of the sensor mounting bracket is substantially equivalent to the footprint of a sensor to which the bracket is to be attached. In preferred arrangements, the sensor mounting bracket is of rectangular footprint.

In certain embodiments, the sensor mounting bracket comprises a rectangular base portion and four side walls each upstanding from an edge of the rectangular base portion.

In embodiments the base portion is formed of two base sections. The first base section is a plate; the second base section is formed of an aperture. More specifically, one half of the base portion forms the first base section and is located between the transverse midline of the bracket and the side wall at one end of the bracket. The other half of the base portion forms the second base section and is located between the transverse midline of the bracket and the side wall at the other end of the bracket.

The first base section may be recessed below the plane including the lower surfaces of each of the side walls of the bracket. More specifically, the first base section may be frustopyramidal. More specifically, the first base section is a plate formed in the shape of a pyramid with four sides and having the upper portion of the pyramid cut off by a plane parallel to the base. The cut off plane is the lowermost portion of the first base section.

In embodiments, the bracket comprises a plurality of sensor attachment fixtures. In preferred embodiments, the bracket comprises a number of sensor attachment fixtures, for example the bracket may comprise one, two, three, four etc. sensor attachment fixtures.

It is much preferred that the attachment fixtures are positioned on the first base section. In embodiments, the sensor attachment fixtures are located on the lowermost planar portion of the first base section.

In embodiments of the invention, the sensor mounting bracket comprises at least one mounting element configured to facilitate attachment of the bracket to a load bearing plate or a sensor support structure.

In preferred embodiments, the sensor mounting bracket comprises a plurality of mounting elements.

The, or each, mounting element extends outwardly from the, or each, side wall of the bracket.

In embodiments wherein the bracket has a rectangular footprint, it is preferred that the bracket comprises three mounting elements. More specifically, the rectangular bracket, comprising four side walls comprises three mounting elements extending outwardly from three side walls of the bracket. Preferably two of the mounting elements, extend outwardly from opposing side walls and the third mounting element extends outwardly of the side wall located at the end of the bracket adjacent the second base section. In such embodiments, it is much preferred that the bracket is longitudinally symmetrical about a central longitudinal axis of the bracket.

In embodiments, the, or each, mounting element comprises an aperture. More specifically, the, or each, mounting element comprises an aperture having a threaded bore.

The, or each, mounting element is configured to receive an attachment fastener.

The, or each, attachment fastener may be a bolt, rivet, weld, adhesive or the like.

In certain embodiments, the, or each, mounting element may comprise a flexible decoupling element. The, or each, flexible decoupling element is/are operable to further reduce mounting stresses when the sensor mounting bracket is mounted to a load bearing plate or a load cell support structure. Such flexible decoupling elements are particularly advantageous when the sensor mounting bracket is to be attached to a sensor for use in a weigh scale requiring an extremely accurate measurement of load.

Preferably the sensor mounting bracket of the first aspect is attachable to a sensor in the form of a load cell. Preferably the load cell is symmetrical about a central vertical axis.

The sensor is preferably attached to the sensor mounting bracket by a coupling element. The coupling element may be attached to or through the, or each, sensor attachment fixture of the bracket and to or through a sensor mounting fixture of a sensor.

More specifically the coupling element may be one or more of a bolt, rivet, weld, adhesive or the like.

In preferred embodiments, the coupling element comprises a plurality of bolts.

Each bolt may be a threaded bolt securable to the sensor by a nut. More specifically the threaded bolt is securable to the sensor by a nut and locked into position by a further locking nut.

In a second aspect of the present invention there is provided a symmetrical sensor mounting bracket assembly comprising a pair of sensor mounting brackets combined together, one above the other in parallel orientation.

Preferably the symmetrical sensor mounting bracket assembly is formed by combining two identical sensor mounting brackets according to the first aspect of the invention together.

More specifically, a symmetrical sensor mounting bracket assembly is provided by two sensor mounting brackets as hereinabove described combined together, one above the other in parallel orientation. More specifically, the pair of sensor mounting brackets is combined together such that the second base section of a first sensor mounting bracket overlies the first base section of a second sensor mounting bracket with a gap between them and the first base section of a first sensor mounting bracket overlies the second base section of a second sensor mounting bracket with a gap between them. The sensor mounting bracket assembly is longitudinally symmetrical about the central longitudinal axis of the assembly.

In this way, a symmetrical sensor mounting bracket assembly is attachable to a symmetrical sensor by coupling elements attached to or through the, or each, sensor attachment fixture of each bracket and to or through each sensor mounting fixture of the sensor.

It is preferred that in the symmetrical sensor mounting bracket assembly, each sensor mounting bracket is in accordance with the first aspect of the invention. Further, it is preferred that the symmetrical sensor mounting bracket assembly is coupled to a sensor symmetrical about a central vertical axis comprising first and second mounting surfaces on the same horizontal plane.

By providing a symmetrical sensor mounting bracket assembly attached to a symmetrical sensor, various advantages are realised. For example, the sensor output is not affected by the mounting arrangement. The mounting effects are cancelled out by using symmetry of the sensor and in the mounting bracket so that the load cell performance is greatly unaffected by the mounting. An accuracy of between 5,000 to 25,000 divisions before calibration is readily achievable. When utilized with a symmetrical sensor, the invention provides a sensor arrangement both in function and in its mounting wherein cancellation of the so-called mounting effect is nearly complete to the tolerances of production processes and not limited by the material characteristics.

According to a third aspect of the present invention there is provided a sensor assembly comprising a sensor symmetrical about a central vertical axis and comprising first and second mounting surfaces each on the same horizontal plane and a plurality of sensor mounting brackets coupled to the sensor at the first and second mounting surfaces, wherein the sensor mounting brackets are configured for attachment to a support structure and to a loading fixture.

In preferred embodiments, the sensor assembly of the third aspect comprises a sensor mounting bracket according to the first aspect.

In much preferred embodiments, the sensor assembly comprises a symmetrical sensor mounting bracket assembly according to the second aspect.

Features of one or more embodiments of the first, second and third aspects may be combined with one or more features of one or more other embodiments of the first and second aspects.

According to a fourth aspect of the present invention, there is provided a weigh scale comprising a sensor coupled to sensor mounting bracket assembly according to the second aspect of the invention and further comprising a load bearing structure coupled to the mounting elements of the pair of sensor mounting brackets.

The weigh scale may be a bench scale.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

Embodiments of the present invention will now be described, by way of example only, with reference to the accompanying drawings in which.

DESCRIPTION OF SOME EXEMPLARY EMBODIMENTS

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

Further, although the invention will be described in terms of specific embodiments, it will be understood that various elements of the specific embodiments of the invention will be applicable to all embodiments disclosed herein.

In the drawings, similar features are denoted by the same reference signs throughout.

Figure 1:
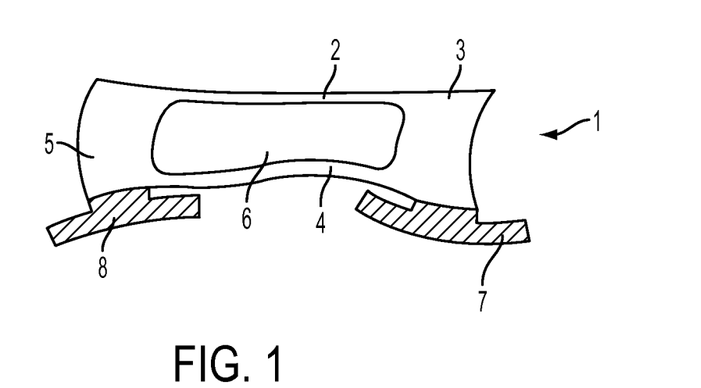
FIG. 1 depicts a sensor mounted to a loading fixture and a support structure, and the resultant transfer of mounting distortion to the sensor.

Referring to FIG. 1 there is depicted a side view of a symmetric sensor 1 mounted to a loading fixture 7 and a support structure 8. The sensor shown is in the form of a load cell 1. The load cell 1 is formed of a substantially rectangular block of material comprising first and second loading members 3, 5 joined together by flexure elements 2, 4. As known in the art, each flexure element can have a strain responsive element, such as a strain gauge, mounted thereon and configured to respond to the forces acting on the flexure elements of the load cell 1 when a load is applied thereto.

The load cell 1 comprises four apertures 6 (only one shown) in the material of the load cell 1 which are profiled and arranged such that the load cell 1 is capable of resolving and measuring shear forces and bending moments resulting from the application of a load thereto. Also known in the art, the apertures 6 can contain strain transfer elements and sensors for measuring the strain effects. These may include such elements as bending beams, strain gauges, force sensors or other sensors.

The load cell 1 comprises mounting fixtures (not shown) located at each end thereof for coupling the load cell 1 to a loading fixture 7 and a support structure 8. The mounting fixtures provide a mounting surface at each end of the load cell 1 onto which the loading fixture 7 and the support structure 8 may be mounted. The mounting surfaces provide a horizontal surface onto which the loading fixture 7 and the support structure 8 may be mounted.

Attachment fixtures (not shown) in the form of threaded bolts are provided to attach the loading fixture 7 and the support structure 8 to the load cell 1 at the mounting fixtures.

In load cells known in the art, mounting surfaces are parallel to each other and with each mounting surface located on an opposing surface of the load cell at the opposite end to the mounting surface. As a result, an asymmetric load cell is provided wherein asymmetry is in the positioning of the mounting surfaces relative to one another and the subsequent location of the loading fixture and the support structure when attached to the mounting fixtures.

The inventors have found that the distortion and detrimental effects due to the asymmetric attachments to the loading fixture and support structure as known in the art may be reduced by designing a load cell wherein the mounting surfaces are on the same plane.

However, direct mounting of the load cell to the loading fixture and the support structure may still result in the transfer of mounting distortion to the load cell.

This is because attachment fixtures distort the end locations causing output changes that are undetermined and that change with load and temperature and even time and usage. The transfer of the mounting distortion in such an arrangement is shown in FIG. 1.

Figure 2A:
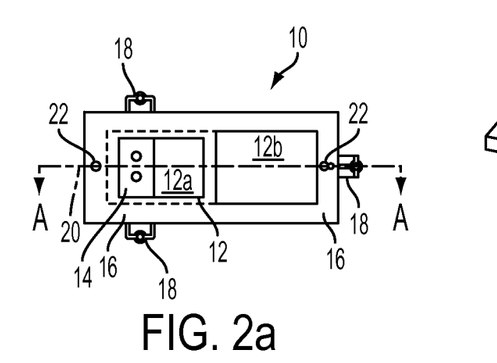
FIGS. 2a, 2b, 2c, 2d show a sensor mounting bracket according to an embodiment of the first aspect of the invention.
Figure 2B:
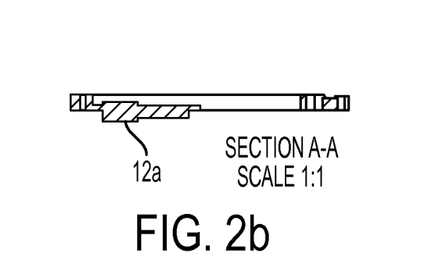
Figure 2C:
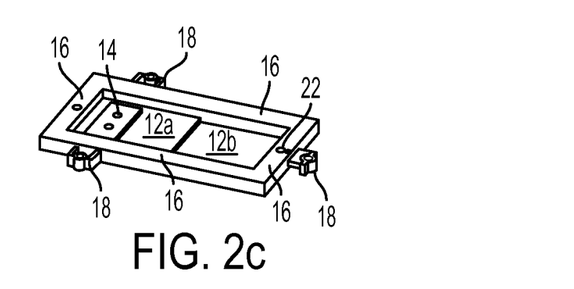
Figure 2D:
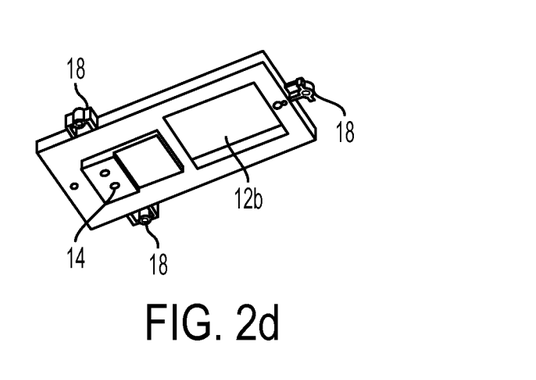
Figure 3A:
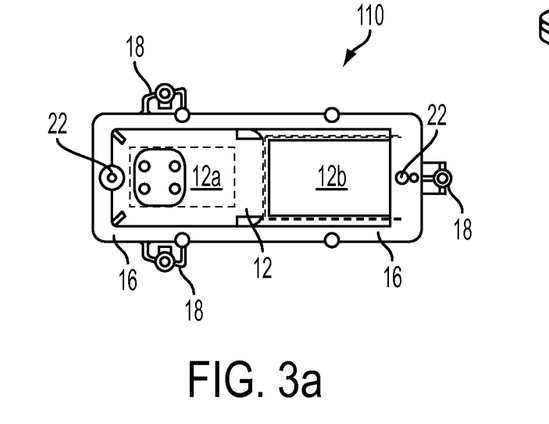
FIGS. 3a, 3b, 3c, 3d show a sensor mounting bracket according to another embodiment of the first aspect of the invention.
Figure 3B:
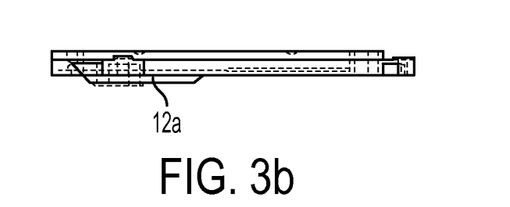
Figure 3C:
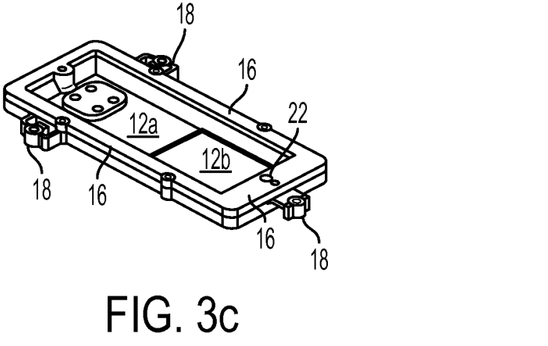
Figure 3D:
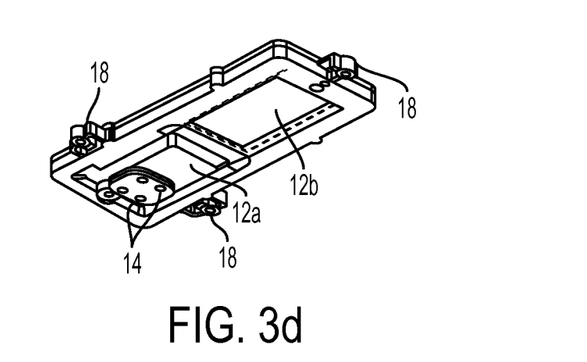

FIGS. 2a to 2d show a sensor mounting bracket 10 according to an embodiment of the first aspect of the present invention. The bracket 10 is configured for attachment to a sensor, particularly a load cell. Referring initially to FIG. 2a, bracket 10 comprises a base portion 12 formed of a first base section 12a and a second base section 12b. The first base section 12a is frustopyramidal in shape and comprises apertures 14 for receiving fasteners such as bolts or the like. In the embodiment shown, the first base section 12a comprises two apertures 14. Apertures 14 provide the sensor attachment fixtures of the bracket 10. The second base section 12b is formed of an aperture. Upstanding from the edges of base portion 12 are four side walls 16. Side walls 16 have a box-section.

Mounting elements 18 extend from three of the side walls 16 of bracket 10. The mounting elements 18 have a central aperture for receiving attachment fasteners (not shown). The attachment fasteners provide an attachment of a support structure and/or a loading fixture to the bracket 10. The mounting elements project outwardly from the side walls 16 from which they extend and are arranged such that the bracket is longitudinally symmetrical about a central longitudinal axis 20 of the bracket 10.

Apertures 22 in the side walls 16 are configured to receive control members (not shown).

FIGS. 3a to 3d show a sensor mounting bracket 110 according to another embodiment of the first aspect of the present invention. The sensor mounting bracket 110 differs from the embodiment of FIG. 2 in that it comprises four apertures 14 for receiving fasteners rather than two.

Figure 4:
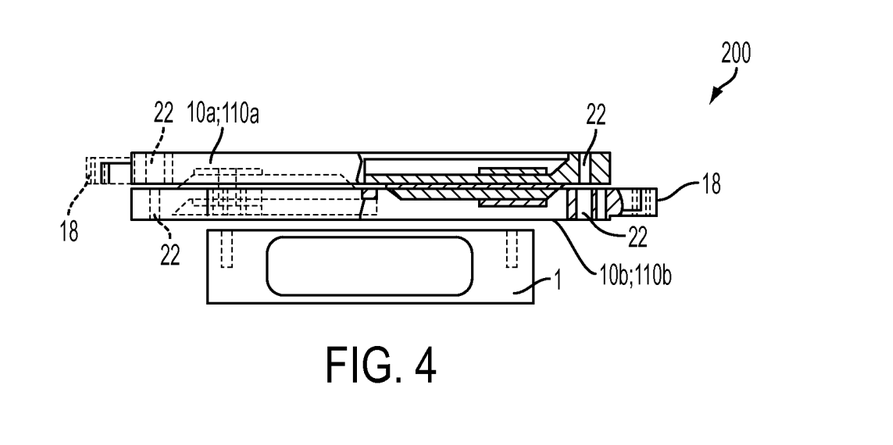
FIG. 4 depicts a sensor mounting bracket disjointed assembly according to an embodiment according to the second aspect of the invention showing orientation.

Referring to FIG. 4, an embodiment of a sensor mounting bracket assembly 200 according to the second aspect of the invention is shown. The sensor mounting bracket assembly 200 according to embodiments of the second aspect of the invention is formed by combining a first mounting bracket 10a; 110a to an identical second mounting bracket 10b; 110b. Control members (not shown) are then inserted into apertures 22 to align the brackets 10; 110 in position relative to one another. In such an assembly the first mounting bracket 10a; 110a is aligned on top of a second mounting bracket 10b; 110b such that the first base section 12a of the first mounting bracket 10a; 110a is located in the second base section 12b of the second mounting bracket 10b; 110b. The brackets 10; 110 are combined together in parallel relation one above the other in such an assembly with a gap between them.

Figure 5:
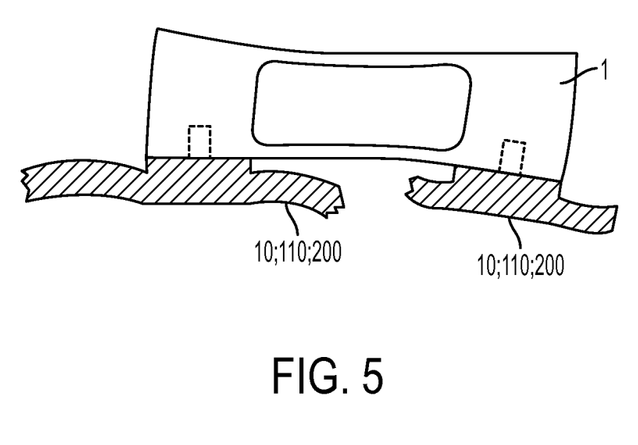
FIG. 5 depicts the transfer of mounting distortion to a sensor mounted on a bracket according to the first aspect of the invention.

Referring to FIG. 5, the effect of the use of a sensor mounting bracket 10; 110 or a sensor mounting bracket assembly 200 according to the invention on the transfer of symmetric mounting distortion to a load cell 1 is shown. When a load is applied to the load cell 1, so-called mounting effects are substantially reduced, if not obviated, such that the load cell performance is greatly unaffected by loading. This is due to the sensor mounting bracket 10; 110/sensor mounting bracket assembly 200 providing symmetrical stresses from attachment fasteners as well as from loading effects caused by eccentric load positions that are rejected by the shear sensing means.

Thermal effects on attachment stress are also rejected, as are load cell and portion bending effect stresses.

As a result, a higher degree of accuracy in measuring the applied load is achieved than would be possible in an asymmetric load cell mounting arrangement.

Figure 6A:
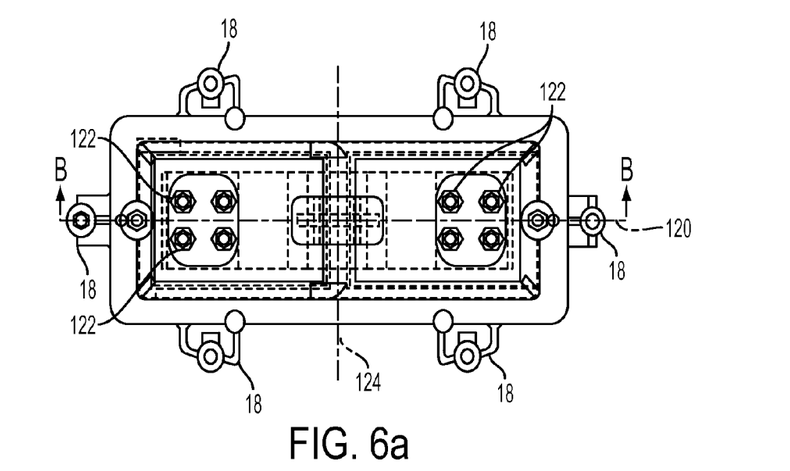
FIGS. 6a, 6b, 6c show a sensor assembly according to an embodiment of the third aspect of the invention comprising a sensor mounting bracket assembly according to an embodiment of the second aspect of the invention.
Figure 6B:
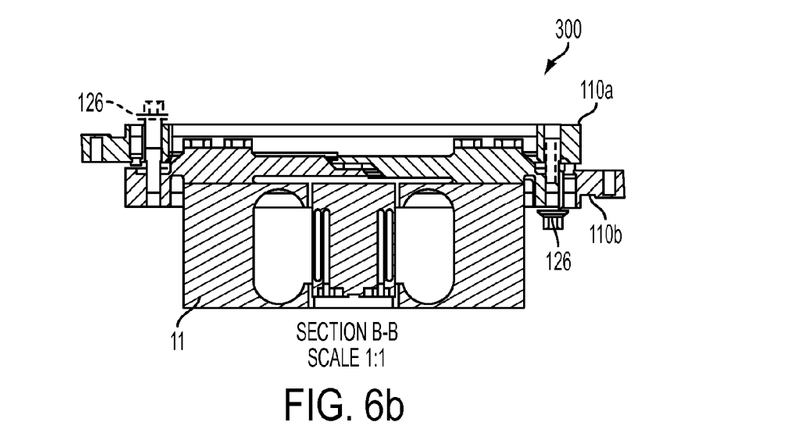
Figure 6C:
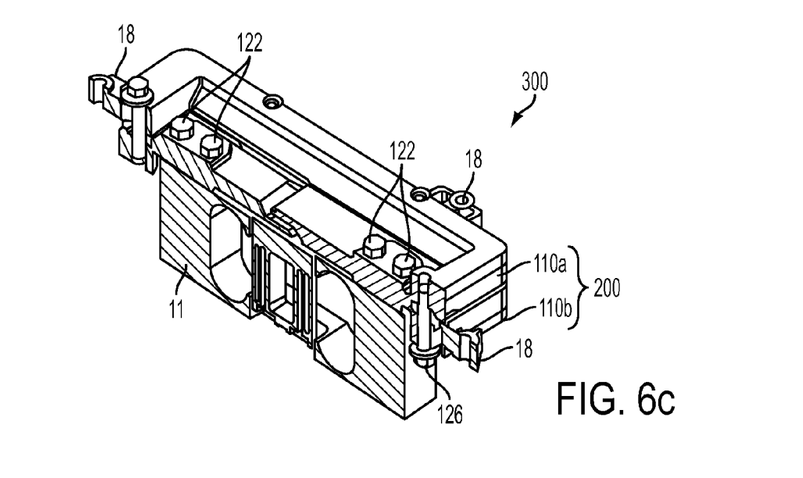

FIGS. 6a to 6c depict a sensor assembly 300 according to an embodiment of the third aspect of the invention. Sensor mounting brackets 110a and 110b of a sensor mounting bracket assembly 200 are coupled to a sensor 11 in the form of a load cell in the depicted arrangement. A control member 126, in the form of a bolt, is inserted into apertures 22 to restrict the movement of the brackets 110a, 110b from a position relative to each other. In the embodiment shown, a single control member is used; however a second one may be employed as shown in phantom. Bolts 122 attach the brackets 110a and 110b respectively to the mounting surfaces of sensor 11 through mounting fixtures (not shown). The assembly 300 is longitudinally symmetrical about the central longitudinal axis 120 of the assembly 300 and has symmetric stiffness about the transverse midline 124 of the assembly. This symmetry improves sensor rejection of output errors due to one or more of: thermal changes, eccentric loading conditions and load cell material characteristics making it more accurate and cost effective. The use of identical brackets 110a and 110b reduces cost. Provisions are included in the brackets 110a and 110b for adjustments in load cell deflection limits. Three mounting elements 18 with apertures therein in each bracket 110a and 110b provide for more stable support and load effect stress with less dependence on the support and loading attachments to the brackets. Decoupling flexible elements are included in the three mounting elements as thin connection members to the walls of each bracket 110a and 110b to further reduce mounting stresses.

Various modifications are envisaged that are within the scope of the present invention as set forth in the appended claims. For example, the sensor mounting bracket may be of any suitable footprint for attachment to the required sensor. For example if the sensor is of circular footprint, a sensor mounting bracket of circular footprint would be suitable for attachment to the sensor.

A pair of identical sensor mounting brackets according to the first aspect of the invention are coupled together to form a longitudinally symmetrical sensor mounting bracket assembly. The symmetrical sensor mounting bracket assembly is coupleable to a symmetrical sensor at its mounting surfaces to provide identical brackets for mounting a sensor with symmetrical provisions for attachment to both a supporting structure and a loading fixture. The supporting structure is mounted to the sensor on the same side as the loading fixture mounting. In this way, symmetrical stresses from various attachment fasteners as well as from loading effects caused by eccentric load positions are cancelled out by the configuration of the sensor assembly. In this way, the various forces acting on the sensor are resolved such that the strain responsive element(s) of the sensor are sensing shear forces acting on them.

The thermal effects and end portion bending effect stresses on the attachment fixtures and sensor respectively are cancelled out by the symmetrical configuration of the sensor assembly.

The invention claimed is:

1. A sensor mounting bracket comprising: a base portion and at least one side wall upstanding from an edge of the at least one base portion; at least one sensor attachment fixture located on the base portion and configured to facilitate attachment of the bracket to a sensor mounting fixture; and at least one mounting element extending outwardly from the at least one side wall configured to facilitate attachment of the bracket to a load bearing plate or a sensor support structure, wherein the at least one mounting element is located between ends of the at least one side wall with respect to a top view and/or a bottom view of the sensor mounting bracket.

2. A mounting bracket according to claim 1 wherein the mounting bracket is of rectangular footprint.

3. A mounting bracket according to claim 2 wherein the mounting bracket comprises a rectangular base portion and four side walls each upstanding from an edge of the rectangular base portion.

4. A mounting bracket according to claim 3 wherein the base portion is formed of two base sections.

5. A mounting bracket according to claim 4 wherein the first base section is a plate and the second base section is formed of an aperture.

6. A mounting bracket according to claim 5 wherein one half of the base portion forms the first base section and is located between a transverse midline of the bracket and the at least one side wall at one end of the bracket, and the other half of the base portion forms the second base section and is located between the transverse midline of the bracket and another side wall at the other end of the bracket.

7. A mounting bracket according to claim 2, wherein the bracket comprises three mounting elements.

8. A mounting bracket according to claim 1 wherein the bracket comprises an even number of sensor attachment fixtures.

9. A mounting bracket according to claim 1, wherein the attachment fixture/fixtures is/are positioned on a base section.

10. A mounting bracket according to claim 9 wherein the sensor attachment fixture/fixtures is/are located on the lowermost planar portion of the base section.

11. A mounting bracket according to claim 1 wherein the sensor mounting bracket comprises a plurality of mounting elements.

12. A mounting bracket according to claim 1 wherein the, or each, mounting element extends outwardly from the, or each, side wall of the bracket.

13. A mounting bracket according to claim 1 wherein the, or each, mounting element comprises an aperture.

14. A mounting bracket according to claim 13 wherein the, or each, mounting element comprises an aperture having a threaded bore.

15. A mounting bracket according to claim 13 wherein the, or each, mounting element is configured to receive an attachment fastener.

16. A mounting bracket according to claim 15 wherein the, or each, attachment fastener may be at least one of a bolt, rivet, weld, or adhesive.

17. A mounting bracket according to claim 1 wherein the mounting element comprises a flexible decoupling element.

18. A mounting bracket according to claim 1 wherein the mounting bracket is attachable to a sensor in the form of a load cell.

19. A mounting bracket according to claim 1 wherein the at least one mounting element is cantilevered from the at least one of the at least one side wall a distance corresponding to a thickness of the at least one of the at least one side walls at the beginning of the cantilevering.

20. A mounting bracket according to claim 1 wherein the at least one mounting element is located within a perimeter about the base portion that is within a distance from an outside of at least one of the at least one side wall that is less than twice a longitudinal length of the base portion.

21. A mounting bracket according to claim 1 wherein the at least one mounting element is located adjacent at least one of the at least one side walls.

22. A mounting bracket according to claim 1 wherein the at least one mounting element includes a through hole to receive a fastener, wherein the through hole has a component that is located from the at least one side wall a distance corresponding to a thickness of the at least one of the at least one side walls at the location where the at least one mounting element extends from the at least one side wall.

23. A mounting bracket according to claim 1 wherein the at least one mounting element is located within a perimeter about the base portion that is within a distance from an outside of at least one of the at least one side wall that is less than a longitudinal length of the base portion.

24. A mounting bracket according to claim 1 wherein the at least one mounting element is located within a perimeter about the base portion that is within a distance from an outside of at least one of the at least one side wall that is less than a longitudinal length of the base portion.

25. An assembly, comprising:
the sensor mounting bracket according to claim 1; and
the sensor mounting fixture, wherein
the sensor mounting bracket is attached to the sensor mounting fixture such that the sensor mounting bracket is located at a top of the sensor mounting fixture at the connection between the two.

26. An assembly, comprising:
the sensor mounting bracket according to claim 1; and
a sensor including the sensor mounting fixture, wherein
the sensor mounting bracket extends past all sides of the sensor with respect to a top view and/or a bottom view.

27. A mounting bracket according to claim 1 wherein sensor attachment fixture is located on the bottom of the mounting bracket.

28. A mounting bracket according to claim 1 wherein sensor attachment fixture is a generally planar component.

29. An assembly, comprising:
the sensor mounting bracket according to claim 1;
a second mounting bracket including:
a second base portion and at least one second side wall upstanding from an edge of the at least one second base portion;
at least one second sensor attachment fixture located on the second base portion and configured to facilitate attachment of the second bracket to a second sensor mounting fixture, and
at least one second mounting element extending outwardly from the at least one second side wall configured to facilitate attachment of the second bracket to the other of the load bearing plate or the sensor support structure relative to that of the sensor mounting bracket, wherein
the at least one second mounting element is located between ends of the at least one second side wall with respect to a top view and/or a bottom view of the second sensor mounting bracket; and
a sensor including the sensor mounting fixture and the second sensor mounting fixture, wherein
the sensor mounting bracket and the second mounting bracket are connected to the sensor on one side of the sensor.

30. A sensor mounting bracket comprising: a base portion and at least one side wall upstanding from an edge of the at least one base portion; at least one sensor attachment fixture located on the base portion and configured to facilitate attachment of the bracket to a sensor mounting fixture; and at least one mounting element extending outwardly from the side wall configured to facilitate attachment of the bracket to a load bearing plate or a sensor support structure, wherein the mounting bracket is of rectangular footprint, the mounting bracket comprises a rectangular base portion and four side walls each upstanding from an edge of the rectangular base portion, wherein the base portion is formed of two base sections, a first base section is a plate and a second base section is formed of an aperture, and the first base section is recessed below a plane including lower surfaces of each of the side walls of the bracket.

31. A mounting bracket according to claim 30 wherein the first base section is frustopyramidal.

32. A mounting bracket according to claim 31 wherein the first base section is a plate formed in the shape of a pyramid with four sides and having an upper portion of the pyramid cut off by a plane parallel to the base.

33. A mounting bracket according to claim 32 wherein the cut off plane is the lowermost portion of the first base section.

34. A sensor mounting bracket comprising: a base portion and at least one side wall upstanding from an edge of the at least one base portion; at least one sensor attachment fixture located on the base portion and configured to facilitate attachment of the bracket to a sensor mounting fixture; and at least one mounting element extending outwardly from the side wall configured to facilitate attachment of the bracket to a load bearing plate or a sensor support structure, wherein the mounting bracket is of rectangular footprint, the bracket comprises three mounting elements, and the bracket comprises three mounting elements extending outwardly from three side walls of the bracket.

35. A mounting bracket according to claim 34, wherein two of the mounting elements, extend outwardly from opposing side walls and the third mounting element extends outwardly of the side wall located at the end of the bracket adjacent a base section.

36. A mounting bracket according to claim 35 wherein the bracket is longitudinally symmetrical about a central longitudinal axis of the bracket.

37. A mounting bracket according to claim 34, wherein the mounting bracket has a generally rectangular shape when viewed from the top or the bottom, wherein a first mounting element is located on a first side of the rectangular shape, a second mounting element is located on a second side of the rectangular shape opposite the first side, and a third mounting element is located on a third side of the rectangular shape different from the second and first sides.

38. A symmetrical sensor mounting bracket assembly comprising: a pair of sensor mounting brackets combined together, one above the other in parallel orientation, wherein the symmetrical mounting bracket assembly is coupleable to a sensor symmetrical about a central vertical axis at first and second mounting locations of the sensor; the first and second mounting locations located on a same horizontal plane.

39. A symmetrical mounting bracket according to claim 38 wherein the bracket is formed by combining two identical sensor mounting brackets.

40. A symmetrical mounting bracket according to claim 39 wherein the two identical sensor mounting brackets are combined together, one above the other in parallel orientation.

41. A symmetrical mounting bracket according to claim 40 wherein the pair of mounting brackets is combined together such that a second base section of a first mounting bracket overlies a first base section of a second mounting bracket and a first base section of the first mounting bracket overlies the second base section of the second mounting bracket.

42. A weigh scale comprising the symmetrical sensor mounting bracket assembly according to claim 38 and further comprising a load bearing structure coupled to the mounting elements of the pair of sensor mounting brackets.

43. A weigh scale according to claim 42 wherein the weigh scale is a bench scale.

44. A symmetrical mounting bracket assembly according to claim 38 wherein the assembly is configured to mount the pair of sensor mounting brackets to a same side of the sensor.

45. A sensor assembly comprising a load sensor symmetrical about a central vertical axis and comprising first and second mounting locations each on the same horizontal plane and a plurality of sensor mounting brackets coupled to the sensor at the first and second mounting locations at locations on outer surfaces of the sensor mounting brackets; wherein the load sensor is directly coupled to the plurality of sensor mounting brackets on the same side of the load sensor; wherein the sensor mounting brackets are configured for attachment to a support structure and to a loading fixture; wherein the load sensor has a length, a width and a height, the length of the load sensor being the largest dimension of the load sensor; wherein sensor mounting brackets have a length and a width and a height, the length of the sensor mounting brackets being the largest dimension; and wherein the sensor mounting brackets extend relative to the load sensor such that the lengths of the sensor mounting brackets are parallel to the length of the load sensor.

46. A sensor assembly according to claim 45 wherein the plurality of sensor mounting brackets comprise a symmetrical sensor mounting bracket assembly.

47. A sensor assembly according to claim 45 wherein the sensor assembly comprises only one load sensor.

* * * * *